United States Patent [19]

Wong et al.

[11] Patent Number: 5,183,268
[45] Date of Patent: Feb. 2, 1993

[54] METAL-TO-METAL WELLHEAD SEAL FOR ROUGH CASING

[75] Inventors: Henry Wong; Ronald D. Quates, both of Houston; Lien-Yan Chen, Spring, all of Tex.

[73] Assignee: FMC Corporation, Chicago, Ill.

[21] Appl. No.: 693,206

[22] Filed: Apr. 30, 1991

[51] Int. Cl.⁵ .................. F16J 15/46; F16J 15/08; E21B 33/02

[52] U.S. Cl. ............................ 277/27; 166/88; 277/73; 277/103; 277/117; 277/209; 277/236; 285/341; 285/917

[58] Field of Search .............. 277/27, 103, 176, 93 R, 277/236, 208, 209, 117, 118, 210, 73; 285/917, 140, 143, 142, 144, 146, 148, 341, 138, 339; 166/82, 84, 86, 88

[56] References Cited

U.S. PATENT DOCUMENTS

| | | | |
|---|---|---|---|
| 591,828 | 10/1897 | Duncan | 285/339 |
| 1,326,272 | 12/1919 | Hinzbagh | 166/88 X |
| 1,855,483 | 4/1932 | Mildren | 166/85 |
| 2,271,936 | 2/1942 | Carlson | 285/341 X |
| 2,824,757 | 2/1958 | Rhodes | 285/146 |
| 3,001,803 | 9/1961 | Watts et al. | 285/143 X |
| 3,011,804 | 12/1961 | Burns | 285/143 X |
| 3,078,332 | 2/1963 | Marx | 285/341 X |
| 3,095,627 | 7/1963 | Johnson | 166/82 X |
| 3,719,375 | 3/1973 | Nordin | 285/339 |
| 4,082,298 | 4/1978 | Sanford | 277/103 X |
| 4,291,768 | 9/1981 | Diehl | 277/73 X |
| 4,665,979 | 5/1987 | Boehm | 277/236 X |
| 4,791,987 | 12/1988 | Cassity et al. | 285/146 X |
| 4,911,245 | 3/1990 | Adamek | 277/236 X |

*Primary Examiner*—Allan N. Shoap
*Attorney, Agent, or Firm*—Douglas W. Rudy; Richard B. Megley

[57] ABSTRACT

An annular metallic seal element for wellhead housings to provide a fluid-tight seal with a well casing that will withstand extreme temperatures and high pressures.

13 Claims, 4 Drawing Sheets

FIG_1
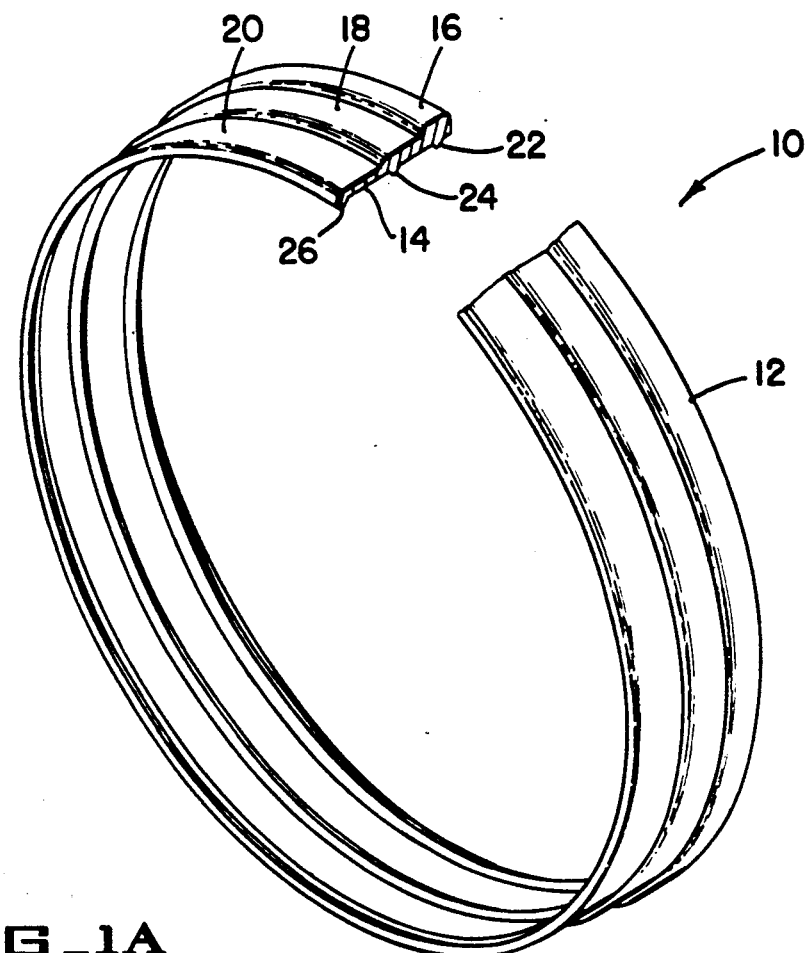
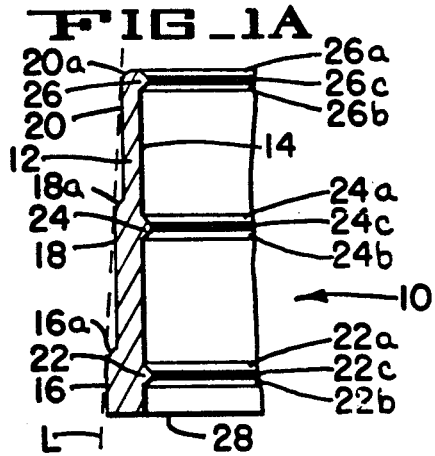
FIG_1A
FIG_1B

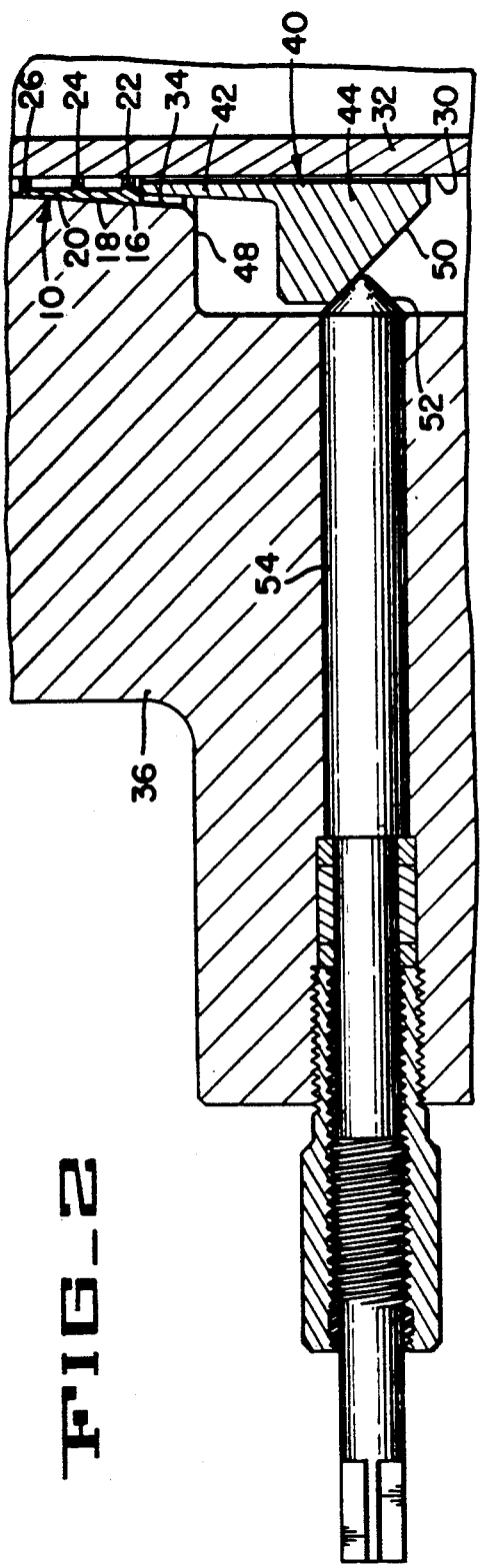
FIG_2
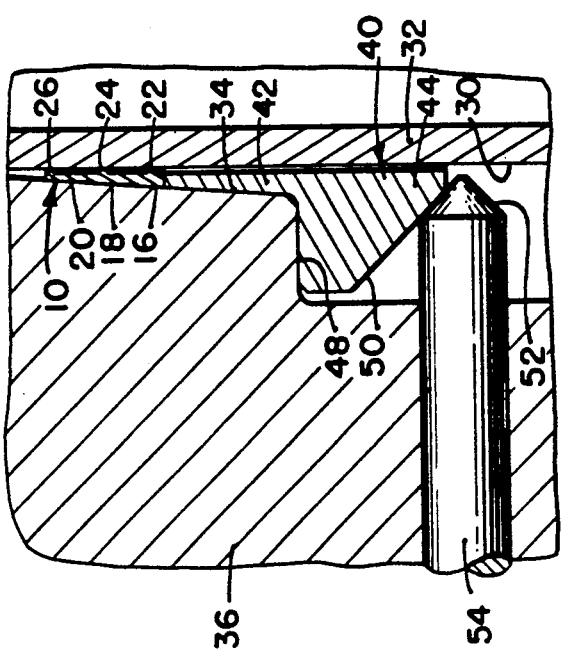
FIG_3

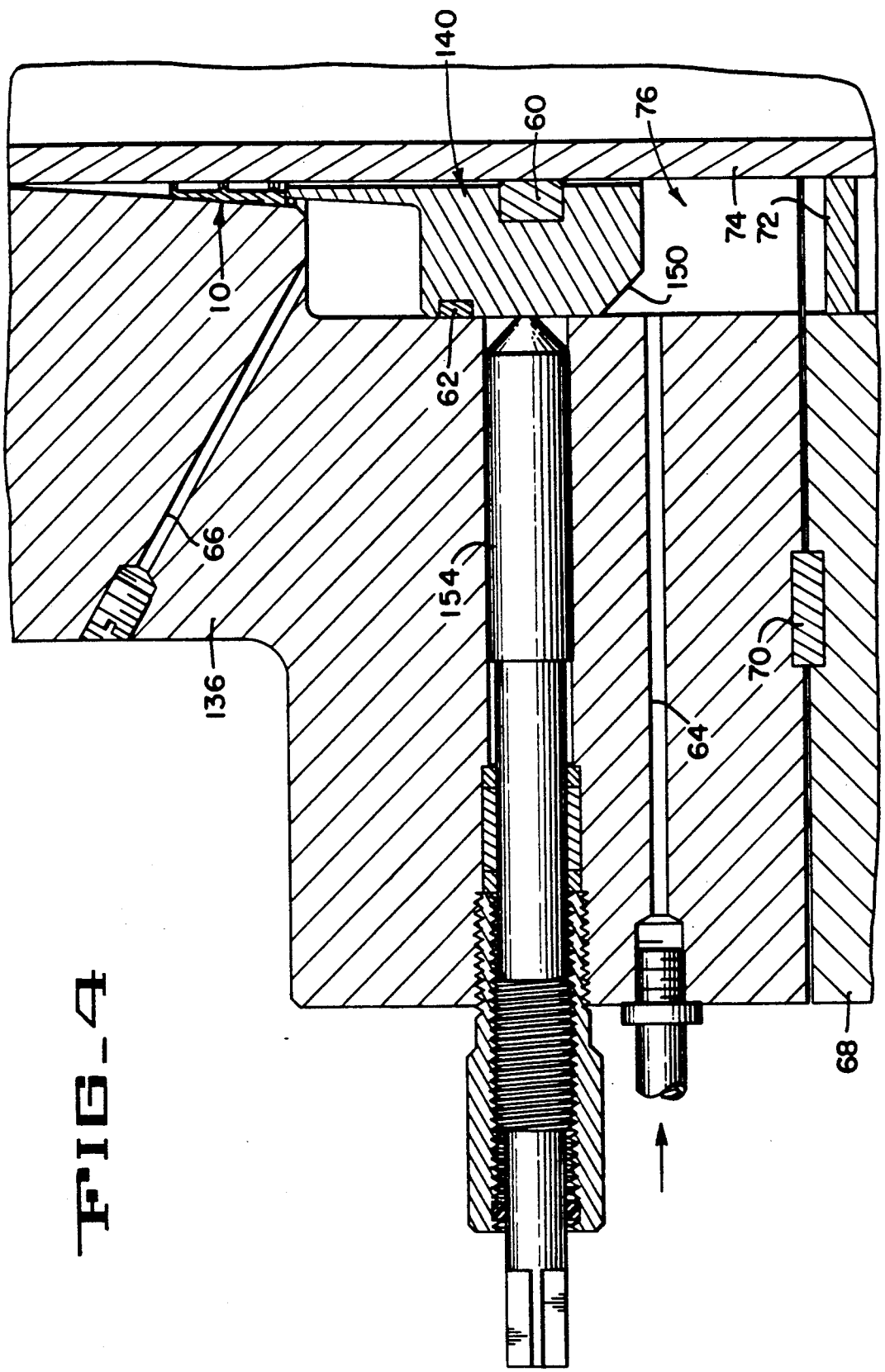

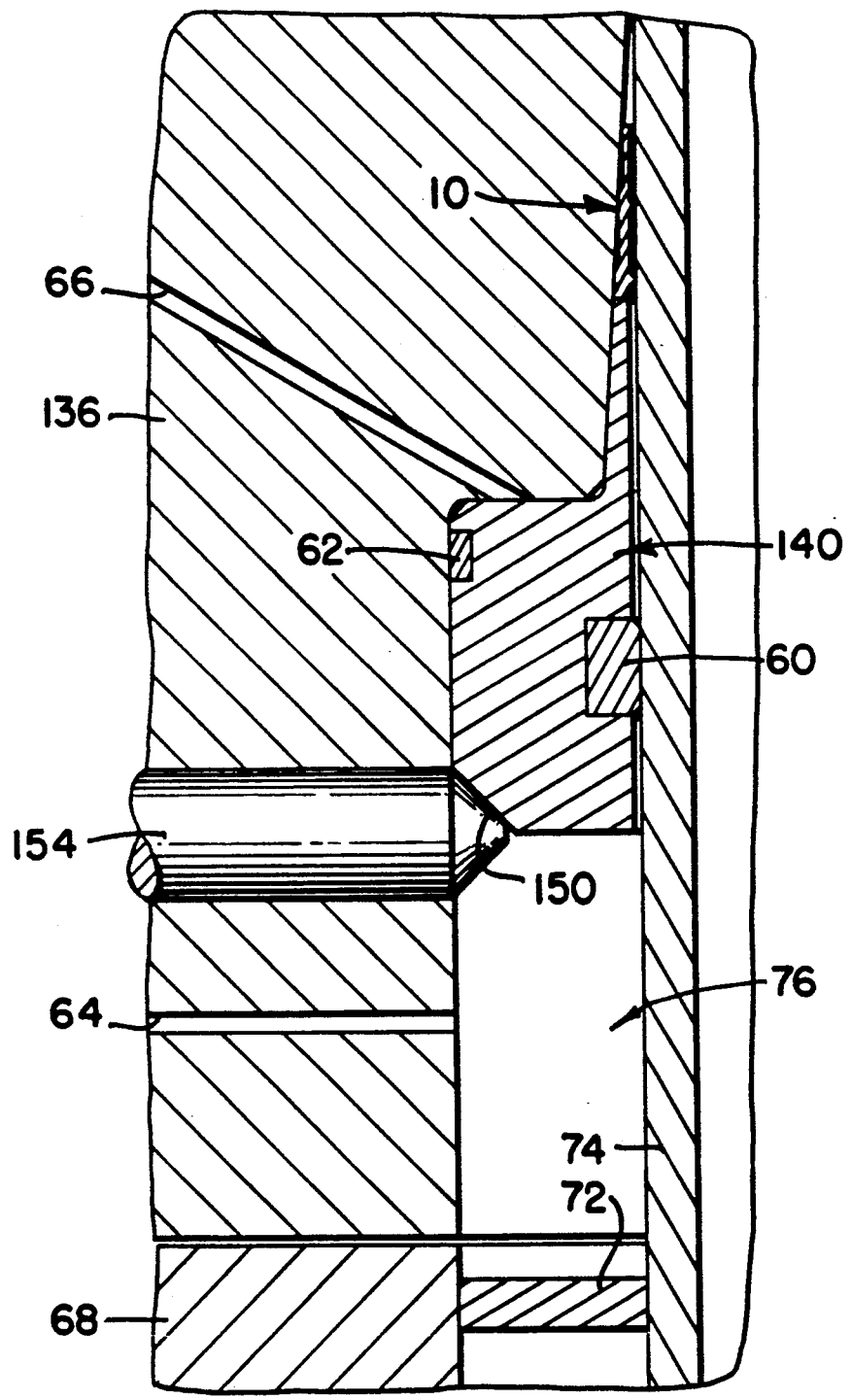

METAL-TO-METAL WELLHEAD SEAL FOR ROUGH CASING

BACKGROUND OF THE INVENTION

This invention relates to seals for oil or gas wellheads, and more particularly to metal seals for providing an extreme temperature, high pressure metal-to-metal barrier between an un-machined or otherwise rough outer surface of a well casing and a surrounding wellhead component.

Although non-metallic packoffs that are used as seals between a well casing and a wellhead housing are known to be satisfactory for a variety of conditions, such packoffs fail to provide the desired sealing functions when subjected to extreme high temperatures and pressures because of cold flowing, extrusion and/or a phenomenon known in the industry as "explosive decompression." As well depth increases, and as greater pressures and temperatures are encountered, the need for better and more reliable wellhead packoffs and seals also increases.

SUMMARY OF THE INVENTION

The present invention comprises an annular metallic seal element of novel cross-sectional configuration that, when properly installed between a well casing and a surrounding wellhead housing, provides a fluid-tight seal between the casing and housing that will withstand extreme temperatures and high pressures without leaking. The seal element of this invention functions satisfactorily with casing having an un-machined or otherwise rough outer surface, thereby eliminating the time and expense required to prepare a smooth casing surface for accepting other types of sealing devices. The seal element has an inner cylindrical surface with a plurality (preferably three) of annular internal ridges that seal against the casing, and an outer surface formed by a plurality (also preferably three) of cylindrical surface portions of step-wise decreasing diameters, the largest at the seal element's lower end, and each surface portion has a rounded (i.e. radiused) upper edge. The rounded upper edges of the outer surface portions reside on a straight line that slopes inwardly from the bottom of the seal element towards its axis at a slight angle, preferably of four degrees, which angle is the same as that of the tapered annular, i.e. frusto-conical, sealing surface of the wellhead housing against which the seal element seals.

The seal element is installed and retained in functional position between the casing and the wellhead housing by a specially-shaped pusher ring that is energized by mechanical or fluid pressure. The pusher ring forces the seal element in a wedging manner into functional position between the casing and wellhead housing, during which movement the seal element is plastically deformed, and its internal ridges and rounded outer surface edges come into metal-to-metal sealing engagement with the opposed casing and housing surfaces, respectively. Because of the angular contact line between the seal element's rounded outer surface edges and the complementary tapered sealing surface of the wellhead housing, radial inward deformation of the sealing element occurs evenly during installation so that its internal sealing ridges establish a uniform metal-to-metal seal with the opposed casing surface.

The pusher ring comprises a relatively slender-walled sleeve with a significantly enlarged annular base extending radially outward from the lower end portion of the sleeve. The upper radial surface of the base provides an annular shoulder that cooperates with a downwardly-facing surface on the wellhead housing to prevent overloading the metal-to-metal seal by forcing it too far into the annulus between the casing and the housing.

Further advantages and features of the present invention will become apparent from the following description of a preferred embodiment thereof, taken in conjunction with the accompanying drawings.

BRIEF DESCRIPTION OF THE DRAWINGS

FIG. 1 is an isometric view, with a portion broken away, of a seal element in accordance with the present invention.

FIG. 1A is a fragmentary view in vertical section, on an enlarged scale, of the seal element of FIG. 1.

FIG. 1B is an enlarged fragmentary view of the upper portion of the seal element as shown in FIG. 1A.

FIG. 2 is a fragmentary view in vertical section of the seal element of FIG. 1 positioned between a well casing and a wellhead housing, and a pusher ring positioned for moving the seal element upward into functional position.

FIG. 3 is a view like FIG. 2, but illustrating the seal element in functional position between the casing and wellhead housing.

FIG. 4 is a view like FIG. 2, showing a pusher ring modified for fluid pressure energization.

FIG. 5 is a view like FIG. 4 but showing the seal element fully installed in functional position.

DESCRIPTION OF THE PREFERRED EMBODIMENT

As seen best in FIGS. 1, 1A and 1B, a metal seal element 10 according to the present invention comprises an annular body 12 with a cylindrical inner surface 14 and an outer surface comprising a plurality, preferably three, of outer cylindrical surface portions 16, 18, 20 of progressively lesser diameters. Extending radially inward from the inner surface 14 are a plurality of axially spaced annular internal ridges 22, 24, 26, the ridges formed by convergent surfaces 22a and 22b, 24a and 24b, 26a and 26b, respectively, and intermediate cylindrical surfaces 22c, 24c, 26c of relatively small axial dimension. The upper edges 16a, 18a, 20a of outer surfaces 16, 18, 20, respectively, are rounded, i.e. have a radiused configuration in cross-section, and these rounded edges are located so that a straight line L (FIG. 1A) sloping inwardly from the lower end 28 of the seal element 10 at a slight angle, preferably of four degrees, is tangential to each edge.

The seal element 10 is designed to provide a metal-to-metal seal between an un-machined or otherwise rough outer surface 30 (FIGS. 2 and 3) of a well casing 32, and a frusto-conical surface 34 of a surrounding wellhead housing element 36. The taper of the frusto-conical surface 34 is complementary to the slope of the line L (FIG. 1A), thus preferably four degrees, so that as the seal element 10 is moved upwardly from a non-functional position shown in FIG. 2 into its functional position shown in FIG. 3 the external edges 16a, 18a, 20a cooperate with the frusto-conical surface 34 of the wellhead component 36 to wedge the seal element inwardly to produce a pressure-tight metal-to-metal contact between the casing surface 30 and the internal seal element ridges 22, 24, 26. As this upward wedging movement occurs the seal element's outer annular rounded edges 16a, 18a, 20a progressively increase their contact pressure against the wellhead housing component surface 34, thereby resulting in the desired metal-to-metal pressure seal with that surface. The strength and ductility of the seal element 10 is such that it deforms and the internal ridges 22, 24, 26 flow plastically into imperfections in the casing surface 30, thereby assuring that a satisfactory metal-to-metal seal is achieved.

Movement of the seal element 10 into its functional position (FIG. 3) is accomplished by means of a pusher ring 40 (FIGS. 2 and 3) comprising a relatively slender-walled sleeve portion 42 extending axially upward from an annular base portion 44. The base portion 44 has an upper radial surface that cooperates with a downwardly-facing radial surface 48 on the wellhead housing component 36 to provide a stop for preventing overloading the seal element outer annular edges 16a, 20a and its internal ridges 22, 24, 26 by upward movement of the ring 40 beyond the position at which the seal element 10 is in its functional location (FIG. 3). The pusher ring 40 has a lower frusto-conical surface 50 against which bear the noses 52 of a plurality of circumferentially spaced wellhead lockdown screws 54 (only one shown) that are threaded inwardly to pressurize the ring 40, and thus the seal element 10, upwardly into their final positions seen in FIG. 5.

Embodiment of FIGS. 4 and 5

Hydraulic pressure also can be used to energize a pusher ring to move the seal element 10 into functional position. To accomplish this, and as shown in FIGS. 4 and 5, a pusher ring 140 with inner and outer annular dynamic seals 60, 62 is employed instead of the ring 40, and a hydraulic pressure inlet port 64 and vent port 66 are provided in a wellhead housing component 136. The component 136 is sealed in a conventional manner to another wellhead component 68 by an annular seal element 70, and a packoff or other appropriate annular seal 72 is provided between the casing 74 and the component 68. When hydraulic pressure is admitted through the port 64 into the annular chamber 76 the pusher ring 140 is forced upwardly, from a position such as shown in FIG. 4, into the position shown in FIG. 5, thereby wedging the seal element 10 into its functional position (FIG. 5) between the casing 74 and the wellhead component 136. Circumferentially spaced lockdown screws 154 (only one shown) are then threaded inwardly against a frusto-conical surface 150 of the pusher ring 140 to lock the ring, and thus also the seal element 10, in their final and functional positions shown in FIG. 5.

Although the best mode contemplated for carrying out the present invention has been herein shown and described, it will be apparent that modification and variation may be made without departing from what is regarded to be the subject matter of the invention.

What is claimed is:

1. A metal seal device for providing a fluid pressure metal-to-metal seal between a non-machined rough surface of a well casing and a surrounding wellhead component, the seal device constructed entirely of metal and comprising
    a) an annular all metal seal body having an upper end, a lower end, a cylindrical inner surface extending between said upper and lower ends, and an outer surface formed by a plurality of cylindrical surface portions having mutually different diameters;
    b) a plurality of axially-spaced annular internal ridges on the body inner surface, said ridges having sealing surfaces for establishing a metal-to-metal seal with a non-machined rough surface of a well casing; and
    c) a plurality of annular external sealing surfaces on the body outer surface, said external sealing surfaces axially positioned to reside on a straight line that slopes inwardly from the lower end of the body towards the body axis.

2. A metal seal device according to claim 1 wherein each internal ridge has two convergent side surfaces and an intermediate cylindrical surface intersecting said side surfaces.

3. A metal seal device according to claim 2 wherein the intermediate cylindrical surfaces have substantially equal diameters.

4. A metal seal device according to claim 2 wherein the external sealing surfaces comprise upper annular edges on the outer cylindrical surface portions, said edges having a rounded configuration in cross-section.

5. A metal seal device according to claim 1 wherein the external sealing surfaces are located tangentially to a straight line that slopes at an angle of substantially four degrees with respect to the axis of the seal body.

6. A metal seal device according to claim 1 having three internal ridges.

7. A metal seal device according to claim 1 having three external sealing surfaces.

8. A metal seal device according to claim 1 wherein the external sealing surfaces establish a metal-to-metal seal with a frusto-conical surface of a surrounding wellhead component, and the sealing surfaces of the internal ridges establish a metal-to-metal seal with a rough well casing surface, when the seal body is axially forced in a wedging manner into functional position between said wellhead component and said well casing.

9. A metal seal device according to claim 1 including a pusher ring for installing the seal body in functional position between a well casing and a surrounding wellhead component, said pusher ring including means for accepting a force biasing said ring in an axial direction, and means for transmitting said biasing force to the seal body for moving said body into its said functional position.

10. A metal seal device according to claim 9 wherein the pusher ring includes an annular body portion and a relatively slender-walled sleeve-like portion extending axially from said body portion.

11. A metal seal device according to claim 10 wherein the biasing force accepting means comprises an annular surface on the ring body portion that cooperates with force application means on the wellhead component.

12. A metal seal device according to claim 11 wherein the force application means comprises a plurality of wellhead lockdown screws spaced circumferentially in ports in the wellhead component.

13. A metal seal device according to claim 11 wherein the force application means comprises hydraulic pressure.

* * * * *